United States Patent [19]

Brems

[11] 4,223,568
[45] Sep. 23, 1980

[54] PRECISION POLYGON GENERATOR

[76] Inventor: John H. Brems, 32867 White Oaks Trail, Birmingham, Mich. 48010

[21] Appl. No.: 958,934

[22] Filed: Nov. 8, 1978

[51] Int. Cl.² .......................... F16H 37/06; F16H 1/28
[52] U.S. Cl. .......................................... 74/660; 74/52; 74/797; 74/804
[58] Field of Search ................... 74/52, 797, 660, 801, 74/802, 805, 804

[56] References Cited

U.S. PATENT DOCUMENTS

| | | | |
|---|---|---|---|
| 1,072,834 | 9/1913 | Delvin | 74/797 |
| 1,173,478 | 2/1916 | Beardshaw | 74/797 |
| 1,590,902 | 6/1926 | Natisch | 74/660 |
| 2,309,047 | 1/1943 | Culbertson | 74/52 |
| 2,676,799 | 4/1954 | Fletcher | 74/52 |
| 3,554,363 | 1/1971 | Elineau | 74/660 |
| 3,857,292 | 12/1974 | Brems | 74/52 |
| 4,044,633 | 8/1977 | Lee | 74/802 |
| 4,137,797 | 2/1979 | Brems | 74/801 |

FOREIGN PATENT DOCUMENTS

| | | | |
|---|---|---|---|
| 19254 | 9/1934 | Australia | 74/804 |
| 353593 | 5/1961 | Switzerland | 74/52 |
| 6044 | of 1915 | United Kingdom | 74/52 |
| 749777 | 5/1956 | United Kingdom | 74/797 |

*Primary Examiner*—Leslie Braun
*Attorney, Agent, or Firm*—Barnes, Kisselle, Raisch & Choate

[57] ABSTRACT

A mechanism to generate a polygonal path such as a square with much greater accuracy than is presently possible. This is accomplished with the use of only circular gears or their equivalent, that is to say, without expensive specially machined parts. The mechanism includes first, second and third rotating members on spaced axes with connecting means between said members and a support frame and an eccentric member mounted on the third rotating member on a fourth axis displaced from the axis of the third rotating member.

7 Claims, 14 Drawing Figures

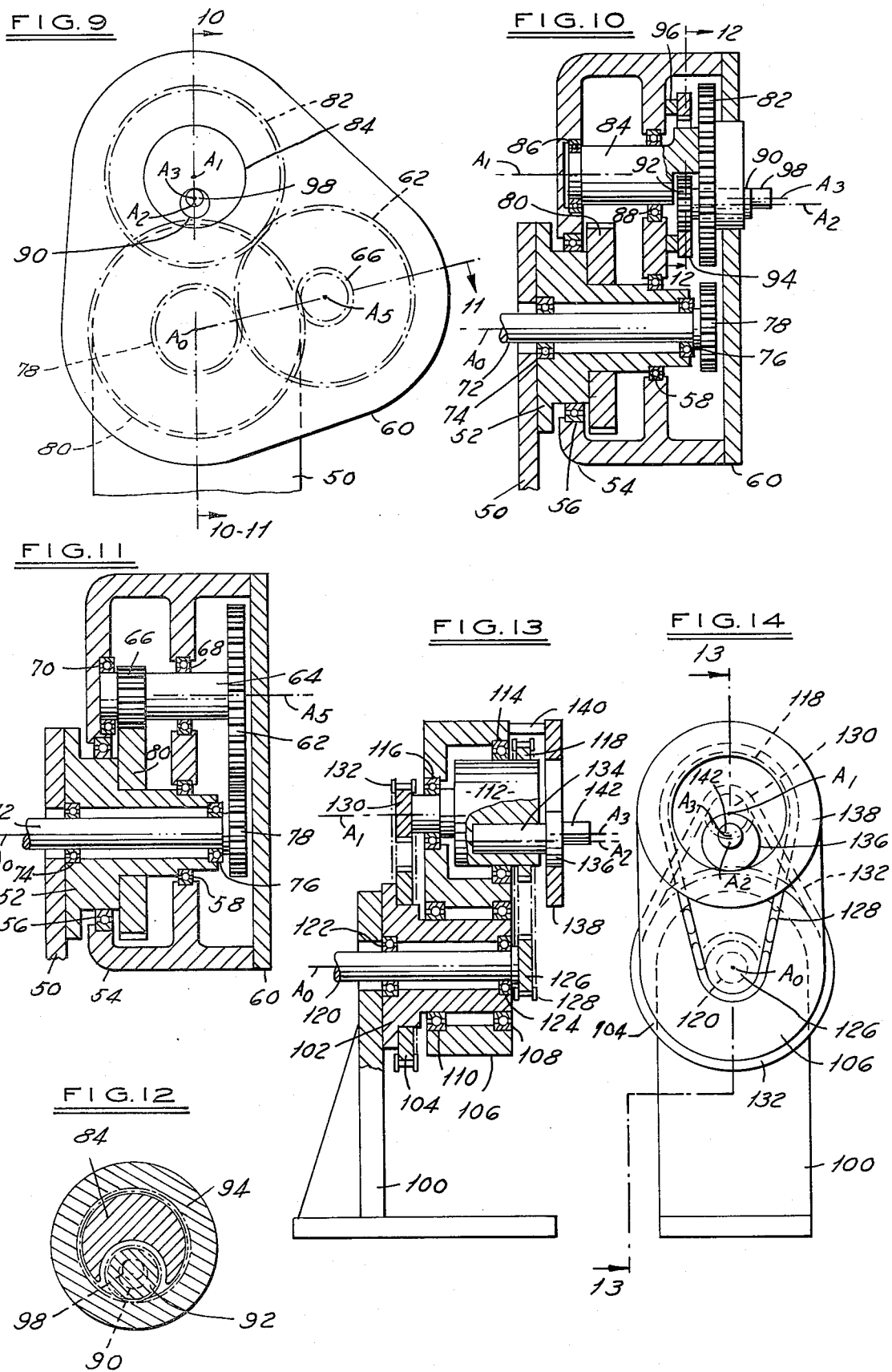

PRECISION POLYGON GENERATOR

This invention relates to a Precision Polygon Generator and more particularly to a mechanism having an output member capable of generating a polygonal path with high precision.

It is an object of this invention to provide a mechanism utilizing only circular gears or their equivalent to generate a polygonal path of multiple sides (4, 6, 8, for example) very accurately.

It is a further object of this invention to provide a means whereby the various geometrical parameters required by the mechanism designer may be logically ascertained.

Other objects and features of the invention will be apparent in the following specification and claims in which the invention is described together with details to enable a person skilled in the art to practice the invention, all in connection with the best mode presently contemplated by the inventor for the practice of the invention.

Figure 1:
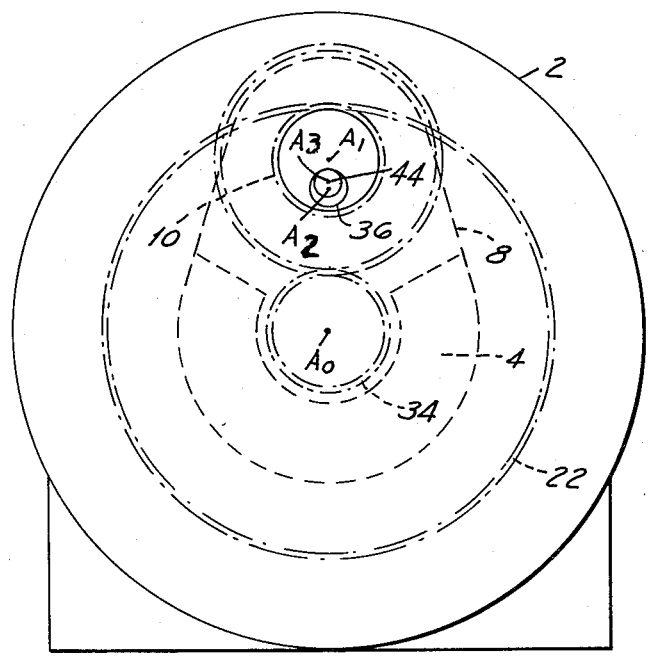
Figure 2:
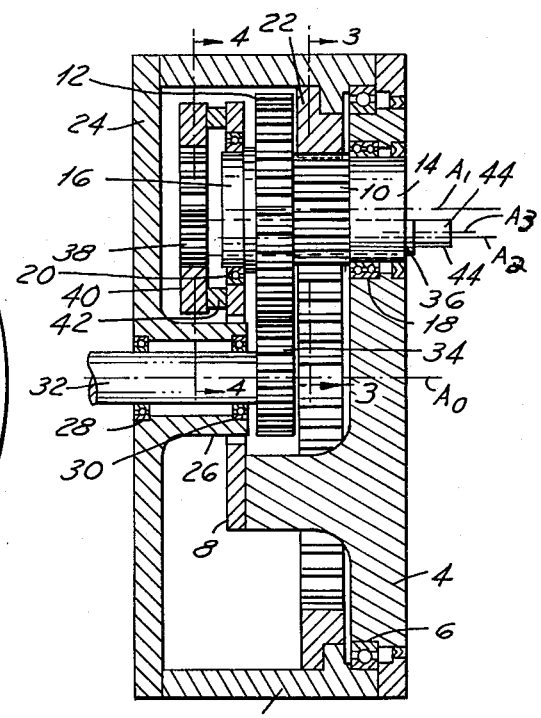

Drawings accompany the disclosure and the various views thereof may be briefly described as:

FIG. 1, an end view of the apparatus to perform the invention taken from the right side of FIG. 2.

FIG. 2, a sectional view on a vertical section line of FIG. 1.

Figure 3:
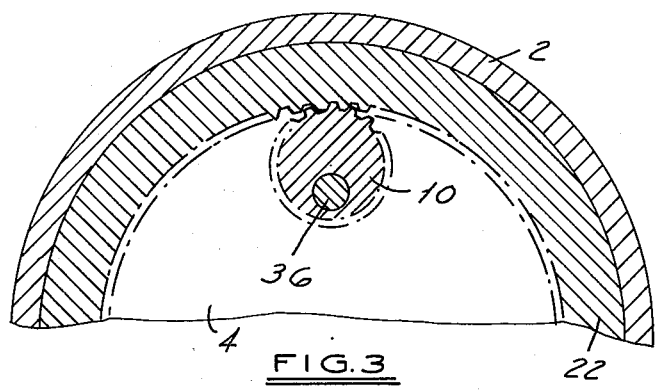

FIG. 3, a section on line 3—3 of FIG. 2.

Figure 4:
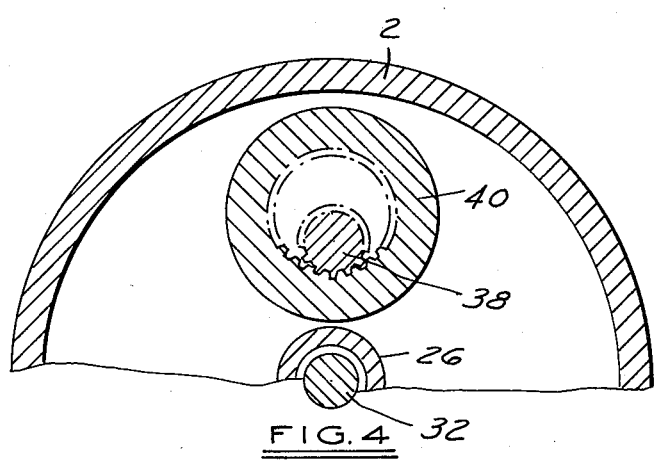

FIG. 4, a section on line 4—4 of FIG. 2.

Figure 5:
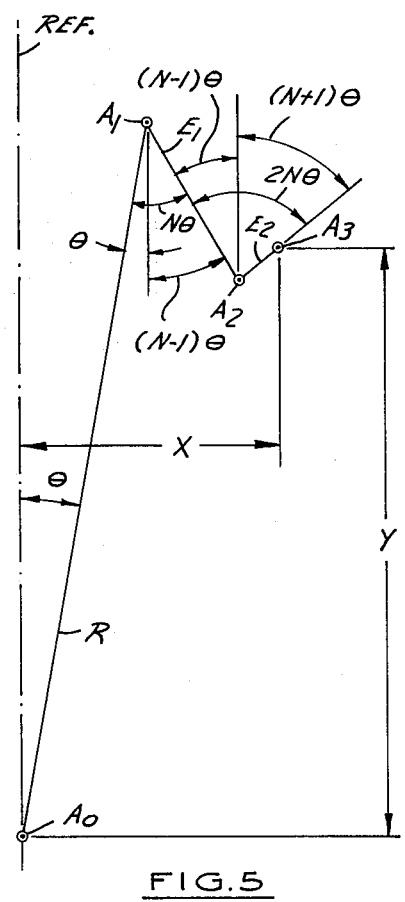

FIG. 5, a schematic diagram of the kinematic motion of all axes.

Figure 6:
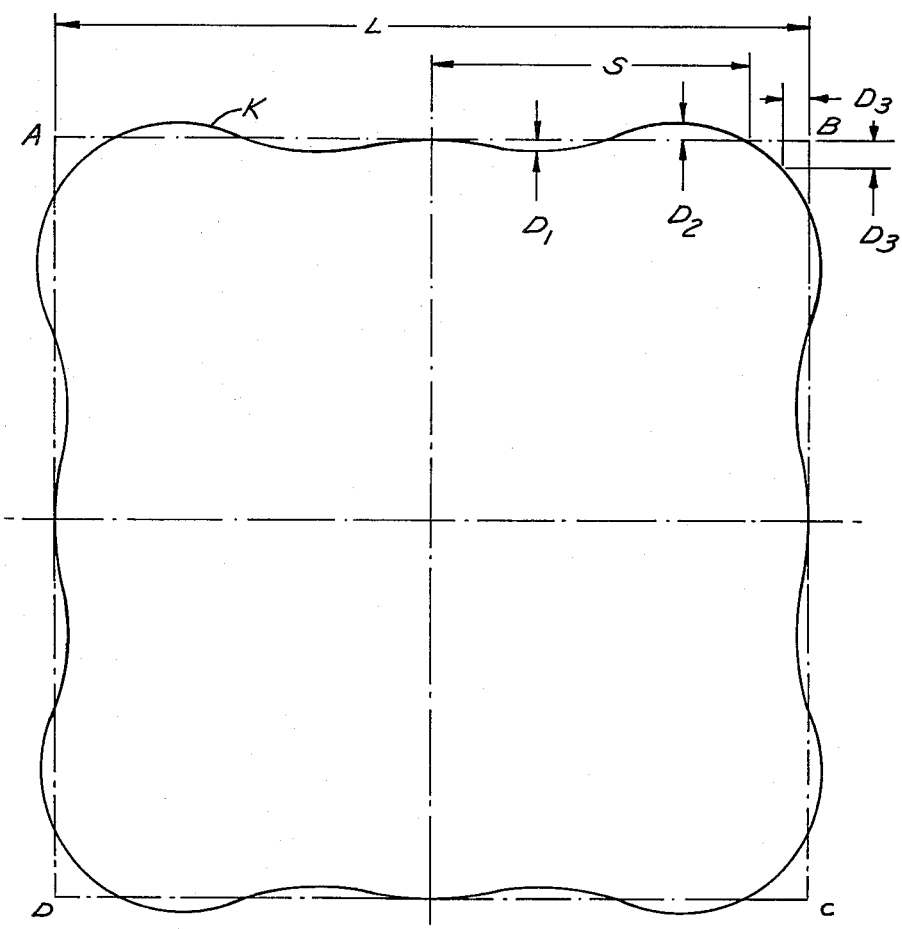

FIG. 6, a diagram of the ideal square of the intended motion with exaggerated deviations of the actual.

Figure 7:
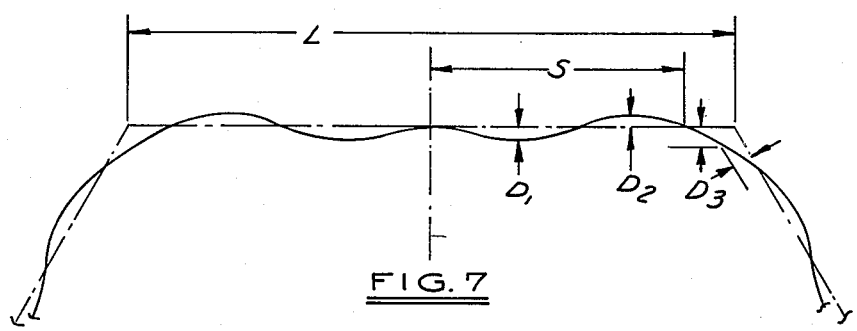

FIG. 7, a diagram illustrating a portion of an ideal hexagon and related generated curve.

Figure 8:
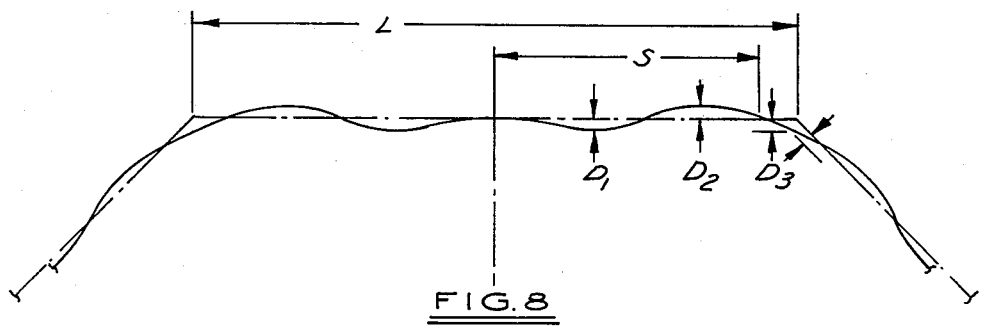

FIG. 8, a diagram illustrating a portion of an ideal octagon and related generated curve.

FIG. 9, an end view of a modified structure from the right side of FIG. 10.

FIG. 10, a sectional view on line 10—10 of FIG. 9.

FIG. 11, a sectional view on line 11—11 of FIG. 9.

FIG. 12, a sectional view on line 12—12 of FIG. 10.

FIG. 13, a sectional view of a third embodiment taken on line 13—13 of FIG. 14.

FIG. 14, an end view of the device shown in FIG. 13.

REFERRING TO THE DRAWINGS:

In FIGS. 1, 2, 3, and 4, a housing 2 supports a planetary carrier 4, through a bearing 6, capable of accepting radial, thrust, and moment loads. An extension plate 8 is fastened to the planetary carrier 4 by bolts (not shown) or other suitable means and rotates with it about the stationary axis $A_0$. A cluster gear assembly made up of planet gear 10, intermediate gear 12, and shaft extensions 14 and 16 rotates in bearings 18 and 20 mounted in the planetary carrier 4 and the extension plate 8; this rotation takes place about the moving axis $A_1$. The planet gear 10, concentric with axis $A_1$, is suitably formed to mesh with a stationary internal gear 22 mounted in the housing 2. The ratio between the pitch diameters of internal gear 22 to the pitch diameter of planet gear 10, as shown in FIGS. 1, 2, 3 and 4 is 4:1; therefore, as the planetary carrier rotates through one revolution about axis $A_0$, the planet gear 10 rotates through four revolutions in the opposite direction with respect to the planetary carrier 4.

A cover 24 is fastened to the housing 2 by suitable bolts (not shown) and is fashioned with a suitable boss 26 in which are seated bearings 28 and 30 concentric with axis $A_0$; these bearings support the input shaft 32 to which is fastened the input gear 34. This gear 34 is suitably formed to mesh with the intermediate gear 12. Rotation of the shaft 32 by some suitable external drive means causes the gear 34 to drive the gear 12; this in turn drives the planet gear 10 meshed with internal gear 22, thereby causing the planetary carrier 4 to rotate about the axis $A_0$. It is equally possible to drive the planetary carrier 4 directly although there is a significant reduction of input torque required to drive the mechanism as described above.

A shaft 36, FIGS. 2 and 3, is rotatably mounted in the cluster gear assembly 10, 12, 14 and 16 and rotates on an axis $A_2$ displaced from the center $A_1$ of that assembly. The inboard end of the shaft 36 is formed into a gear 38, FIGS. 2 and 4, which is suitably formed to mesh with an internal gear 40 on axis $A_1$ mounted to the plate 8 through a spacer 42. Suitable screws or welds, not shown, hold these parts in assembly. The internal gear 40 as a pitch diameter which is substantially two times as great as the pitch diameter of the gear 38. Therefore, as the cluster assembly 10, 12, 14, 16 rotates on axis $A_1$ with respect to the planetary carrier 4 and plate 8, the shaft 36 will rotate on axis $A_2$ at twice the angular velocity in the opposite direction, as driven by gear 38 in mesh with internal gear 40.

The outboard end of shaft 36 is formed into an eccentric extension 44, FIG. 2, which is circularly concentric to an axis $A_3$ which is displaced from the axis $A_2$ of the shaft 36. This extension 44 is the output member of the mechanism and its centerline, axis $A_3$, can be made to describe a nearly perfect square or other polygon as will be subsequently described.

In the mechanism described above, as the planetary carrier rotates about the fixed axis $A_0$, the axis $A_1$ rotates about that fixed axis $A_0$ through the same angle. Referring to FIG. 5, which is a schematic diagram of the kinematic motion of all axes, this angle from some arbitrary reference line is defined as $\theta$ and is positive when $A_1$ moves clockwise from the reference. The following quantities are now defined:

R = distance from axis $A_0$ to axis $A_1$
$E_1$ = distance from axis $A_1$ to axis $A_2$
$E_2$ = distance from axis $A_2$ to axis $A_3$
N = ratio between gear 10 and internal gear 22 (4:1 in FIGS. 1, 2, 3, 4)

After axis $A_1$ has rotated through an angle $\theta$ clockwise from the reference starting line, the axis $A_2$ has rotated through an angle $N\theta$ counterclockwise about axis $A_1$ with respect to the line R, and the axis $A_3$ has rotated through an angle $2N\theta$ clockwise about axis $A_2$ with respect to the line $E_1$. The other angles entered into FIG. 5 are derivations of these generated angles, $\theta$, $N\theta$, and $2N\theta$.

It will be seen further that the position of the axis $A_3$ may be described in terms of its X and Y coordinates, with the axis $A_0$ as the origin, and as a function of $\theta$ by the following parametric equations:

$$X = R \sin \theta + E_1 \sin (N-1)\theta + E_2 \sin (N+1)\theta$$

$$Y = R \cos \theta - E_1 \cos (N-1)\theta + E_2 \cos (N+1)\theta$$

By arbitrarily defining the radius R as 1, the foregoing equations reduce to the following:

$$X = \sin \theta + E_1 \sin (N-1)\theta + E_2 \sin (N+1)\theta \qquad (1)$$

$$Y = \cos\theta - E_1 \cos(N-1)\theta + E_2 \cos(N+1)\theta \quad (2)$$

In cases for which it is desired to have the mechanism describe a nearly perfect square, the parameter N is made equal to 4 in which case equations (1) and (2) become:

$$X = \sin\theta + E_1 \sin 3\theta + E_2 \sin 5\theta \quad (3)$$

$$Y = \cos\theta - E_1 \cos 3\theta + E_2 \cos 5\theta \quad (4)$$

The problem now reduces to finding those values of $E_1$ and $E_2$ which cause the values of X and Y of the parametric equations (3) and (4) to describe a nearly perfect square. There are a variety of ways in which this evaluation of $E_1$ and $E_2$ may be approached. A simple, straightforward illustrative system will now be described.

At $\theta=0$, $Y=1-E_1+E_2$ (from equation (4)), this will now be defined as $Y_0$, i.e., $Y_0=1-E_1+E_2$. It is now desired that $Y=Y_0$ at two other values of $\theta$, which will be defined as $\theta_{N1}$ and $\theta_{N2}$. Since equation (4) is an odd function, $Y=Y_0$ at $-\theta_{N1}$ and $-\theta_{N2}$. In effect, this requirement will force the value of Y to be equal to $Y_0$ at the four points defined at $\theta_{N1}$, $\theta_{N2}$, $-\theta_{N1}$ and $-\theta_{N2}$. At $\theta=\theta_{N1}$, equation (4) becomes:

$$Y = Y_0 = 1 - E_1 + E_2 = \cos\theta_{N1} - E_1 \cos 3\theta_{N1} + E_2 \cos 5\theta_{N1}$$
$$1 - \cos\theta_{N1} = E_1(1 - \cos 3\theta_{N1}) - E_2(1 - \cos 5\theta_{N1}) \quad (5)$$

Similarly, at $\theta=\theta_{N2}$, equation (4) becomes:

$$1 - \cos\theta_{N2} = E_1(1 - \cos 3\theta_{N2}) - E_2(1 - \cos 5\theta_{N2}) \quad (6)$$

For any two non-identical values of $\theta_{N1}$ and $\theta_{N2}$ which are numerically defined, equations (5) and (6) may be solved simultaneously to yield values of $E_1$ and $E_2$. For example, if $\theta_{N1}=40°$ and $\theta_{N2}=27.5°$, $$E_1 = 0.203699$$

$$E_2 = 0.036909$$

When these values of $E_1$ and $E_2$ are substituted back into equations (3) and (4) and the values of X and Y calculated for closely spaced values of the parametric angle $\theta$ from 0° to 360°, it is found that any graphical portrayal of the resultant points so nearly approximates a square as to be of little value for comparative purposes. Therefore, the errors must be defined numerically.

Referring to FIG. 6, the perfect square which is intended to be approximated with the subject mechanism is shown by the dot-dash lines ABCD, while the path generated by this mechanism through movement of extension 44 and axis $A_3$ is shown by the curve K. The excursions of K about either side of the target square are greatly exaggerated to classify the definitions shown in the drawing. The magnitude of these error excursions scaled to a square having a unit side, and as shown in FIG. 6, may be defined as follows:

$D_1$ = maximum inward error, exclusive of corners, which by symmetry is reached in eight places $D_2$ = maximum outward error which by symmetry is reached in eight places $D_3$ = inward corner error parallel to a side which by symmetry occurs in eight places S = portion of a semiside which corresponds to the position reached at $\theta=\theta_{N2}$ $2S/L$ = fraction of a side in which the errors do not exceed $D_1$ or $D_2$ In the example above in which $\theta_{N1}=40°$ and $\theta_{N2}=27.5°$, the error criteria defined above are as follows:

$D_1 = 0.00113$ $D_2 = 0.00114$ $D_3 = 0.0049$ $S = 0.484$ $2S/L = 0.968$

This is obviously an excellent approximation to a true square in which the generated curve does not vary from a true square by more than ±0.00114 for 96.8% of the length of a side.

It is possible to select other values of $\theta_{N1}$ and $\theta_{N2}$ to achieve slightly different approximation characteristics. A group of illustrative examples are presented in the following Table I:

TABLE I

| | | SQUARE APPROXIMATION ERRORS L = 1 | | | | | | |
|---|---|---|---|---|---|---|---|---|
| $\theta_{N1}$ | $\theta_{N2}$ | $E_1$ | $E_2$ | $D_1$ | $D_2$ | $D_3$ | S | $\frac{2S}{L}$ |
| 45 | 30.7 | .215512 | .043939 | .00249 | .00249 | 0 | .5 | 1 |
| 43 | 29.0 | .210173 | .040565 | .00174 | .00191 | .00202 | .495 | .990 |
| 43 | 29.4 | .210469 | .040829 | .00183 | .00184 | .00199 | .495 | .990 |
| 40 | 28 | .204062 | .037190 | .00121 | .00108 | .00482 | .484 | .968 |
| 40 | 27.5 | .203699 | .036909 | .00113 | .00114 | .00490 | .484 | .968 |
| 35 | 24 | .193935 | .031701 | .00046 | .00049 | .00952 | .456 | .912 |
| 35 | 25 | .194592 | .032115 | .00054 | .00044 | .00927 | .456 | .912 |
| 35 | 24.24 | .194089 | .031798 | .00048 | .00048 | .00946 | .456 | .912 |
| 30 | 20.9 | .186269 | .028025 | .00018 | .00018 | .01351 | .416 | .832 |
| 25 | 17.5 | .179981 | .025233 | .00006 | .00006 | .01699 | .365 | .730 |

A study of Table I reveals that it is possible to judiciously select values of $\theta_{N1}$ and $\theta_{N2}$ to achieve the preferred approximation characteristics. It is clear that other values for $\theta_{N1}$ and $\theta_{N2}$ may be selected other than those shown in the table and the results obtained using the method described above.

It is also clear that other mathematical methods may be employed, other than the system of selecting two null angles, to evaluate the quantities $E_1$ and $E_2$. By whatever mathematical method $E_1$ and $E_2$ are obtained, when they are appropriately derived, the subject mechanism is capable of generating an excellent square approximation.

Further investigation has revealed that the mechanism is equally suitable for approximating other regular polygons. In order to generate a polygon of N sides, it is necessary only to change the ratio of internal gear 22 to planet gear 10 to N:1. It is not necessary to change the gear ratio between internal gear 40 and planet gear 38; this ratio remains at 2:1 for all regular polygons. Investigation has shown that this is the optimum ratio to achieve the best polygon approximation, and, therefore, equations (1) and (2) are usable to evaluate the quantities $E_1$ and $E_2$ if the appropriate value of N is utilized.

If it is desired to approximate a hexagon, N=6 is substituted into equations (1) and (2) which become:

$$X = \sin\theta + E_1 \sin 5\theta + E_2 \sin 7\theta \quad (7)$$

$$Y = \cos\theta - E_1 \cos 5\theta + E_2 \cos 7\theta \qquad (8)$$

Using the same illustrative technique for evaluating $E_1$ and $E_2$ as described in connection with the square, i.e., defining two null angles $\theta_{N1}$ and $\theta_{N2}$ at which quantity Y must equal the Y value at $\theta=0$, the values shown in the following Table II were calculated:

TABLE II
HEXAGON APPROXIMATION ERROR L = .57735

| $\theta_{N1}$ $\theta_{N2}$ | $E_1$ | $E_2$ | $D_1$ | $D_2$ | $D_3$ | S | $\frac{2S}{L}$ |
|---|---|---|---|---|---|---|---|
| 30 20.5 | .112668 | .040872 | .00117 | .00117 | 0 | .288675 | 1 |
| 25 17. | .100907 | .032608 | .00033 | .00037 | .00350 | .272663 | .945 |
| 25 17.3 | .101125 | .032780 | .00035 | .00035 | .00346 | .272800 | .945 |
| 20 13. | .092269 | .027170 | .00007 | .00010 | .00668 | .240856 | .834 |
| 20 13.9 | .092768 | .027502 | .00008 | .00008 | .00652 | .241275 | .836 |
| 15 10.5 | .086902 | .024099 | .000014 | .000014 | .00895 | .195283 | .676 |

The error values are scaled to a hexagon measuring one unit across the flats—and $E_1$ and $E_2$ are scaled to $R=1$. FIG. 7 redefines the error quantities, $D_1$, $D_2$, $D_3$, S and L.

Similarly, if it is desired to approximate an octagon, $N=8$ is substituted into equations (1) and (2) which become:

$$X = \sin\theta + E_1 \sin 7\theta + E_2 \sin 9\theta \qquad (9)$$

$$Y = \cos\theta - E_1 \cos 7\theta + E_2 \cos 9\theta \qquad (10)$$

By again using the two null angle approach the values shown in Table III were calculated:

TABLE III
OCTAGON APPROXIMATION ERRORS L = .414214

| $\theta_{N1}$ $\theta_{N2}$ | $E_1$ | $E_2$ | $D_1$ | $D_2$ | $D_3$ | S | $\frac{2S}{L}$ |
|---|---|---|---|---|---|---|---|
| 22.5 15.4 | .075021 | .035455 | .00067 | .00067 | 0 | .207107 | 1 |
| 20 13.8 | .068970 | .030748 | .00031 | .00031 | .00134 | .200854 | .970 |
| 17.5 13. | .064754 | .027685 | .00017 | .00010 | .00249 | .190000 | .917 |
| 17.5 12.1 | .064107 | .027168 | .00013 | .00013 | .00262 | .189588 | .915 |
| 15 10. | .060035 | .024310 | .00004 | .00006 | .00383 | .173186 | .836 |
| 15 10.5 | .060315 | .024516 | .00005 | .00005 | .00376 | .173415 | .837 |

The error values are scaled to an octagon measuring one unit across the flats and $E_1$ and $E_2$ are scaled to $R=1$. FIG. 8 redefines the error quantities $D_1$, $D_2$, $D_3$, S and L.

This system is equally applicable to N sided regular polygons having an uneven number of sides, including $N=3$ for a triangle.

In summary, with the mechanism described above and using a mathematical process as illustrated above to determine the respective eccentricities, it is possible to generate a polygonal path of exceptional accuracy.

Referring again to FIG. 5, it is important to note that the rotation of the distance vector $E_1$ is in an angular direction opposite to the rotation of the distance vector R; and that the rotation of the distance vector $E_2$ is in an angular direction opposite to the rotation of the distance vector $E_1$; (vectors R and $E_2$ thereby rotate in the same direction.)

A second embodiment capable of generating exactly the same polygonal paths is shown in FIGS. 9, 10, 11 and 12. A suitable bracket 50 supports a base 52 on which is mounted a housing 54. The housing 54 is in effect a planetary carrier and is free to rotate about the base 52 through bearings 56 and 58 about a fixed axis $A_0$. A cover 60 is bolted (bolts not shown) to the housing 56 to form an enclosure suitable for retention of lubricant.

A first planetary cluster consisting of gear 62, shaft 64, and gear 66, FIG. 11, is mounted in housing 54 through bearings 68 and 70, and rotates on the axis $A_5$. An input shaft 72 is mounted in the base 52 through suitable bearings 74 and 76. At its outboard end the input shaft 72 is driven by some suitable prime mover or other mechanism; at its input end the input shaft 72 carries a gear 78 suitably formed to mesh with the gear 62. The gear 66 is suitably formed to mesh with a stationary sun gear 80 mounted on the base 52.

It will be seen that as the input shaft 72 is rotated on axis $A_0$ by an external power source, the gear 78 drives the gear 62, thereby causing the gear 66 meshing with the stationary sun gear 80, to drive the housing 54 about the axis $A_0$. It will be further noted that as the housing and gear 62 rotate on their respective axes, their directions of rotation are identical. To achieve the reversal of rotational direction required by the system as described in the analysis above, it becomes necessary to add a reverse rotating planet.

A gear 82 is suitably formed to mesh with the gear 62 and is mounted on a shaft 84 supported in bearings 86 and 88 in the housing 54. The shaft 84 and gear 82 rotate about an axis $A_1$. It will be noted that as the housing 54 rotates about the axis $A_0$ the gear 82 and shaft 84 now rotate in an opposite direction with a ratio determined by the diameter of gears 80, 66, 62 and 82.

A secondary planetary shaft 90 is mounted for rotation in the shaft 84 and rotates about an axis $A_2$ displaced from the axis $A_1$. A gear 92 is mounted on the shaft 90 and is suitably formed to mesh with an internal gear 94 mounted with suitable screws (not shown) on the housing 54 through a spacer 96. The gear 92 has a pitch diameter equal to one-half the pitch diameter of the mating internal gear 94. It can be seen, therefore, that the gear 92 and shaft 90 rotate in an opposite direction and at an angular velocity, with respect to the shaft 84, two times the angular velocity of the shaft 84 with respect to the housing 54. The outboard end of the shaft 90 is formed into an eccentric extension shaft 98 concentric about an axis $A_3$ displaced from the axis $A_2$. With the distance from axis $A_3$ to axis $A_2$ defined as $E_2$ and the distance from axis $A_1$ to axis $A_0$ defined as R, it will be seen that the conditions of FIG. 5 are achieved. The position of axis $A_5$ is immaterial except insofar as required to meet the meshing requirements of the gears 66 and 62 mounted thereon.

A third embodiment of this mechanism is shown in FIGS. 13 and 14. A mounting bracket 100 supports a base 102 on which is mounted a stationary sprocket 104 on an axis $A_0$. A planetary carrier 106 is mounted on the base 102 through bearings 108 and 110 on which it rotates about axis $A_0$. A planetary shaft 112 is mounted in bearings 114 and 116 in the outboard end of the planetary carrier 106; the shaft 112 rotates about the axis $A_1$ and supports a sprocket 118 concentric thereon.

An input shaft 120 is mounted in the base 102 through bearings 122 and 124 and also rotates on the fixed axis $A_0$. A sprocket 126 is mounted on the shaft 120, and is suitably formed to mesh with a chain 128 which also meshes with the sprocket 118. A sprocket 130 is mounted on the shaft 112 and is suitably formed to mesh with a chain 132 which also meshes with the stationary sprocket 104.

It can be seen, therefore, that as the input shaft 120 is rotated by some external power source, the sprocket 126 drives the sprocket 118 through chain 128. This drives the shaft 112 and sprocket 130 which, through chain 132 and the stationary sprocket 104, causes the planetary carrier 106 to rotate about axis $A_0$. It will also be noted that as the planetary carrier rotates about the axis $A_0$ in a given direction, the shaft 112 rotates about the moving axis $A_1$ in the opposite direction and at a higher angular velocity determined solely by the ratio of the sporcket 104 to the sprocket 130.

A secondary planetary shaft 134 is rotatably mounted in the shaft 112 and rotates on an axis $A_2$; a gear 136 is mounted on the shaft 134 and is suitably formed to mesh with an internal gear 138 mounted to the planetary carrier 106 through spacer 140. The pitch diameter of the internal gear 138 is twice as great as the pitch diameter of the gear 136. Therefore, it will be seen that as the shaft 112 rotates with respect to the planetary carrier 106 at some given angular velocity in a given direction on the axis $A_1$, the gear 136 and shaft 134 are forced to rotate with respect to shaft 112 in the opposite direction and at twice the angular velocity about axis $A_2$.

The extended portion of shaft 134 is formed into an eccentric shaft 142 concentric about an axis $A_3$ displaced from axis $A_2$. It can be seen, therefore, that when the spacing between axes $A_2$ and $A_3$ is set equal to $E_2$, when the spacing between axes $A_2$ and $A_1$ is made equal to $E_1$ and when the spacing between axes $A_1$ and $A_0$ is made equal to R that the geometric conditions established above are met and the shaft 142 on axis $A_3$ describes the path so determined.

In all the embodiments described herein, the input power was transmitted from an input shaft via a chain or gears to the planetary member. Through this method, a large number of turns is required for the output shaft to complete its polygonal path; in essence, a significant reduction is incorporated into the mechanism. In each embodiment, the input system described can be eliminated and the input torque and movement applied directly to the planetary carrier. The torque required will become proportionally larger, but only one revolution of the planetary carrier and its associated direct connected input system is required to cause the output shaft to complete a single traverse of the polygonal path.

It is clear that one may summarize the essential elements of the various embodiments for a mechanism to generate a high precision polygonal path of N sides as requiring a planetary carrier rotating at a given angular velocity about a fixed first axis, a primary planetary member which rotates at N times that angular velocity and in the opposite direction with respect to the planetary carrier, a secondary planetary member mounted on the primary member and rotating with respect to that primary planetary member at twice the angular velocity and in the opposite direction as that primary planetary member rotates with respect to the planetary carrier, and finally an eccentric member mounted on the secondary planetary member. In essence, the mechanism must meet the requirements graphically portrayed in FIG. 5. These various rotational requirements may be met through the use of internal gears, external gears, chains and sprockets or various combinations thereof.

I claim:

1. A mechanism capable of generating with high precision a regular polygonal path having N sides comprising:
   (a) a frame,
   (b) a first rotating member mounted for rotation on said frame and rotating in a first angular direction at a first angular velocity about a fixed first axis,
   (c) a second rotating member mounted for rotation on said first rotating member and rotating on a moving second axis displaced from said first axis,
   (d) first means connecting for rotation said second rotating member and said frame through which said second rotating member rotates with respect to said first rotating member in a second direction opposite to said first direction and at a second angular velocity equal to N times said first angular velocity,
   (e) a third rotating member mounted for rotation on said second rotating member and rotating about a moving third axis displaced from said second axis,
   (f) second means connecting for rotation said first rotating member and said third rotating member through which said third rotating member rotates with respect to said second rotating member in a direction opposite said second direction and at a third angular velocity two times as great as said second angular velocity,
   (g) an eccentric output member mounted on said third rotating member centered on a fourth axis displaced from said third axis, and
   (h) means driving one of said rotating members.

2. A mechanism capable of generating with high precision a regular polygonal path having N sides comprising:
   (a) a frame,
   (b) a first rotating member mounted for rotation on said frame and rotating about a fixed first axis,
   (c) a first internal gear member mounted on said frame concentric about said first axis,
   (d) a second gear rotating member mounted for rotation on said first rotating member and rotating on a moving second axis displaced from said first axis and in engagement with said first internal gear and having a pitch diameter 1/N times the pitch diameter of said first internal gear,
   (e) a second internal gear member mounted on said first rotating member concentric about said second axis,
   (f) a third gear rotating member mounted for rotation on said second gear rotating member and rotating on a moving third axis displaced from said second axis and in engagement with said second internal gear member and having a pitch diameter one-half the pitch diameter of said second internal gear member,
   (g) an eccentric output member mounted on said third gear rotating member centered on a fourth axis displaced from said third axis, and
   (h) means driving one of said rotating members.

3. A mechanism as defined in claim 2 in which said driving means comprises an input shaft and means providing a driving relationship between said shaft and one of said rotating members.

4. A mechanism capable of generating with high precision a regular polygonal path having N sides comprising:
   (a) a frame,
   (b) a first rotating member mounted for rotation on said frame and rotating about a fixed first axis,
   (c) a first gear member mounted in said frame concentric about said first axis, (d) a second gear rotating member mounted for rotation on said first rotating member and rotating on a moving second axis displaced from said first axis, (e) a cluster gear rotating member mounted for rotation on said first rotating member comprising:
   (1) a first intermediate gear member in mesh with said first gear member, and
   (2) a second intermediate gear member in mesh with said second gear rotating member, (f) an internal gear member mounted on said first rotating member concentric about said second axis, (g) a third gear rotating member mounted for rotation on said second gear rotating member and rotating on a moving third axis displaced from said second axis and in engagement with said internal gear member and having a pitch diameter one-half the pitch diameter of said internal gear member, (h) an eccentric output member mounted on said third gear rotating member centered on a fourth axis displaced from said third axis, and (i) means driving one of said rotating members.

5. A mechanism as defined in claim 4 in which said driving means comprises an input shaft and means providing a driving relationship between said shaft and said second intermediate gear.

6. A mechanism capable of generating with very high precision a regular polygonal path having N sides comprising:

(a) a frame, (b) a first rotating member mounted for rotation on said frame and rotating about a fixed first axis, (c) a first tangential drive member mounted on said frame concentric about said first axis, (d) a second rotating member mounted for rotation on said first rotating member and rotating on a moving second axis displaced from said first axis and adapted for tangential driving, (e) a flexible drive member connecting said first tangential drive member and said second rotating member in tangential driving engagement, (f) an internal gear member mounted on said first rotating member and concentric about said second axis, (g) a gear rotating member mounted for rotation on said second rotating member and rotating on a moving third axis displaced from said second axis and in engagement with said internal gear member and having a pitch diameter one-half the pitch diameter of said internal gear member, (h) an eccentric output member mounted for rotation on said gear rotating member centered on a fourth axis displaced from said third axis, and (i) means driving one of said rotating members.

7. A mechanism as defined in claim 6 in which said driving means comprises an input shaft, a drive gear on said input shaft and a tangential drive means drivably engaging said drive gear and said second rotating member.

* * * * *